United States Patent [19]
Eberhardt

[11] Patent Number: 5,326,215
[45] Date of Patent: Jul. 5, 1994

[54] UNIVERSAL VEHICULAR RECOVERY AND TOWING PLATFORM

[76] Inventor: Michael Eberhardt, 801 Patio Ct., St. Louis, Mo. 63129

[21] Appl. No.: 916,529

[22] Filed: Jul. 20, 1992

[51] Int. Cl.$^5$ .............................................. B60P 3/07
[52] U.S. Cl. ................................... 414/563; 414/482; 414/494; 410/29.1
[58] Field of Search ............... 414/482, 494, 563, 538; 410/27, 28, 28.1, 29, 29.1, 119, 128; 254/93 HP; 280/402

[56] References Cited

U.S. PATENT DOCUMENTS

| | | | |
|---|---|---|---|
| 2,173,277 | 9/1939 | Jarmin et al. | 414/482 |
| 2,838,191 | 6/1958 | Schramm . | |
| 3,510,016 | 5/1970 | Wolff et al. | 414/563 |
| 3,635,492 | 1/1972 | Mauldin . | |
| 3,674,167 | 7/1972 | Roberts | 414/494 X |
| 3,719,299 | 3/1973 | Oehler | 254/93 HP X |
| 3,779,411 | 12/1973 | Moretti, Jr. | 414/482 |
| 3,993,342 | 11/1976 | Jones et al. | 410/29.1 X |
| 4,222,698 | 9/1980 | Boelter | 414/482 X |
| 4,369,008 | 1/1983 | Cooper | 410/29.1 |
| 4,493,491 | 1/1985 | Karlik | 280/402 |
| 4,568,235 | 2/1986 | Bills, Jr. | 414/477 |
| 4,578,014 | 3/1986 | Colet | 414/494 X |
| 4,750,856 | 6/1988 | Lapiolahti | 410/29.1 X |
| 5,067,774 | 11/1991 | Trowland | 254/93 HP X |

FOREIGN PATENT DOCUMENTS

| | | | |
|---|---|---|---|
| 2620676 | 3/1989 | France | 414/563 |
| 0656356 | 6/1986 | Switzerland | 414/563 |
| 1006496 | 10/1965 | United Kingdom | 410/29.1 |
| 2120620 | 12/1983 | United Kingdom | 414/563 |
| 2186238 | 8/1987 | United Kingdom | 414/482 |

OTHER PUBLICATIONS

Challenger "Transformer I Series" brochure.
Century Wrecker Corporation "Super-Duty Underlift" brochure.
Landoll Corporation "Model 317" brochure.

*Primary Examiner*—Michael S. Huppert
*Assistant Examiner*—James Keenan
*Attorney, Agent, or Firm*—Kalish & Gilster

[57] ABSTRACT

A trailer device for engaging and towing vehicles has, a rigid, longitudinal first frame having front and rear ends and extending substantially horizontally between them, the front end providing attachment to a fifth-wheel type truck tractor for hauling. A vehicle support surface is mounted substantially horizontally on the first frame, having right and left longitudinal portions, each formed of a plurality of segments along its length, at least one segment of each such longitudinal portion of the vehicle support surface being transversely divided into a plurality of subsegments, at least one subsegment of each transversely divided segment being movable. Pneumatic cylinders can move a subsegment of each transversely divided segment of each right and left longitudinal portion of the vehicle support surface. A jacking mechanism is mounted beneath the front end of the rigid longitudinal first frame. Wheels support the rear end of the rigid longitudinal first frame. A vehicle engagement assembly is positioned along a central longitudinal axis of the first frame on the rear end thereof and pivotally attached thereto for securely retaining in position a vehicle loaded at least in part onto the device. A winch at the forward end of the platform also allows even a heavy vehicle, e.g. truck tractor, to be pulled forwardly onto the vehicle support surface for disabled vehicle recovery and/or towing.

19 Claims, 5 Drawing Sheets

UNIVERSAL VEHICULAR RECOVERY AND TOWING PLATFORM

CROSS-REFERENCE

Elements of the present invention are described in disclosure document Ser. No. 182,851 filed Dec. 14, 1987, a copy of which is attached hereto and incorporated by reference.

BACKGROUND OF THE INVENTION

This invention relates to recovering and towing vehicles, such as wreckers and the like for pulling cars, trucks and other vehicles which have been disabled and, more particularly, to a towing vehicle of novel universal type for recovery, loading thereon and towing a disabled vehicle for purposes of moving it.

There are a variety of so-called wreckers in both the patented prior art and in commercial practice, which date back over many decades. By the term "wrecker" is meant a towing vehicle of self-powered, self-contained type typically having a truck-like frame and/or body, and typically supported by dual or tandem dual wheels, the body or frame having a crane, winch or hydraulically extensible structure for engaging a disabled vehicle, lifting it and towing it. Because such a wrecker is itself a powered vehicle, it must be licensed and must comply with all requirements of motor vehicles, including insurance, payment of taxes and the like. Thus, wreckers are expensive to acquire, maintain and operate.

It has previously been proposed to use trailers instead of wreckers for transporting large vehicles, and there are long-bed trailer arrangements for this purpose as proposed, for example, in Schramm U.S. Pat. No. 2,838,191 which proposed an elevatable bed vehicle which is of the type now known as "low-boy", or other conventional flatbed trailer used for transporting, in particular, heavy equipment. Such a flatbed trailer is not suited for routine recovery and transporting of disabled vehicles as loading (off pound hauling) of such vehicles is very cumbersome.

Similarly, Bills, Jr. U.S. Pat. No. 4,568,235 discloses a low-angle tilt trailer having a bed which can be positioned hydraulically to a rearward position in which it engages the ground for facilitating the loading and unloading of equipment. Again, this patent is representative of a type of specialized trailer used for heavy machinery, and wherein the machinery is transported in its entirety (hauled) upon the surface of the trailer.

Mauldin U.S. Pat. No. 3,635,492, discloses a trailer including a hydraulically operated mechanism for elevating or lowering the frame of the trailer, being a light duty construction suited only for transporting of very light loads, as for example, boats and intended to facilitate the launching and recovery of boats. Thus, such patent is typical of other types of trailers suited for pulling loads on and off the vehicle, but such boat trailers and the like are not suited for carrying of heavy vehicles, and particularly disabled vehicles.

For purposes of recovery of a disabled truck tractor, or truck unit Karlik U.S. Pat. No. 4,493,491 discloses an apparatus in the form of a trailer, including a rear deck portion which has a sloping ramp section, there being a winch at the forward portion of the trailer to enable a truck or the like to be pulled onto the ramp section. However, such a trailer is not suited for recovery of a newer type of truck, particularly heavy duty truck tractors, which have air "dams" and other aerodynamic structure at the front of the truck which make them extremely difficult to be engaged by any kind of conventional wrecker, and which structure interferes with the recovery of such a truck by a trailer of the type disclosed in Karlik.

Further, certain trucks, such as fire trucks, which have a very long overhang, present special difficulties for recovery by wreckers and other vehicles of the type identified above.

It is to be appreciated that many trucks, because of their configuration at the front of the vehicle, are only recoverable with difficulty. Although there are heavy duty wreckers which are available for pulling such vehicles, recovery of a disabled vehicle of such a specialized type often requires the removal of bumpers, air dams and other structure, or presents extreme difficulty when recovering, particularly in the case of such fire trucks. Further, because of the extreme cost, for purchase and maintenance as well as for insurance, tax and licensing of such specialized wreckers, few business entities can afford practically to keep such wreckers at ready disposal. Thus, a need exists for a relatively low-cost recovery vehicle, particularly such a vehicle which is of the trailer type, so that high insurance, licensing and other costs of self-contained vehicles can be avoided. A need also exists for such a vehicle which can recover the many types of specialized trucks such as those discussed above which have structure, such as a long front overhang, which interferes with their recovery. By recovery is, of course, meant the engagement of the vehicle to be recovered (whether damaged, disabled, stopped or otherwise inoperable) by the recovering vehicle as for purposes of loading or towing (pulling with some of the towed vehicle's wheels on ground) the vehicle to be recovered.

SUMMARY OF THE INVENTION

Accordingly, it is an object of the present invention to provide a vehicular recovery and towing platform, namely a towing trailer, of specialized, hybrid type suitable for recovery of heavy duty trucks and other vehicles which are difficult to recover because of their extreme weight or particular structure.

It is a further object of the present invention to provide such a vehicular recovery and towing platform which allows a vehicle to be recovered without first requiring the removal of air dams, bumpers or other supposedly interfering structure at the front of the vehicle, and which is useful as well for the recovery of fire trucks and fire engines having long front overhangs in the area of the front bumper thereof.

It is a further object of the present invention to provide such a vehicular recovery and towing platform which greatly facilitates the recovery of the vehicle, allowing a single operator to effectively engage and position any of a variety of disabled vehicles upon the towing platform in a convenient, facile manner and without specialized tools, jigs, hoists or other elaborate adaptations for specific vehicles.

It is a further object of the present invention to provide such a vehicular recovery and towing platform which provides adequate ground clearance, stability, and safe and reliable support for the proper towing of a recovered vehicle, in order to comply with laws and regulations relative to transport or movement of heavy vehicles.

It is also an object of the present invention to provide such a vehicular recovery and towing platform which has relatively few moving parts, so as to increase durability, and which thus can be built economically and reliably so as to be affordable by relatively small commercial entities.

Another object of the present invention is to provide such a vehicular recovery and towing platform which can be used in combination with a truck tractor in lieu of a wrecker for the recovery of heavy duty trucks and other vehicles.

Accordingly, in furtherance of these objects, the present invention is, briefly, a device for recovering and towing vehicles. The device has a rigid, longitudinal first frame having front and rear ends and extends substantially horizontally therebetween. The front end of the first frame is adapted for attachment to a fifth-wheel type truck tractor for hauling thereby. A vehicle support surface is mounted substantially horizontally on the first frame and has right and left longitudinal portions, each right and left longitudinal portion being formed of a plurality of segments along the length thereof. At least one segment of each right and left longitudinal portion of the vehicle support surface is transversely divided into a plurality of subsegments, and at least one subsegment of each transversely divided segment is movable. Means are provided for causing at least one subsegment of each transversely divided segment to be movable. A jacking mechanism is mounted beneath the front end of the rigid longitudinal first frame and a set of wheels supports the rear end of the rigid longitudinal first frame. A vehicle engagement assembly is positioned along a central longitudinal axis of the first frame on the rear end thereof and is pivotally attached thereto for securely retaining in position a vehicle loaded at least in part onto the device.

Other objects as well as features of the present invention will be in part apparent and in part pointed out hereinbelow.

BRIEF DESCRIPTION OF THE DRAWINGS

Corresponding references indicate corresponding parts throughout the several views of the drawings.

DESCRIPTION OF THE PREFERRED EMBODIMENT

Figure 1:
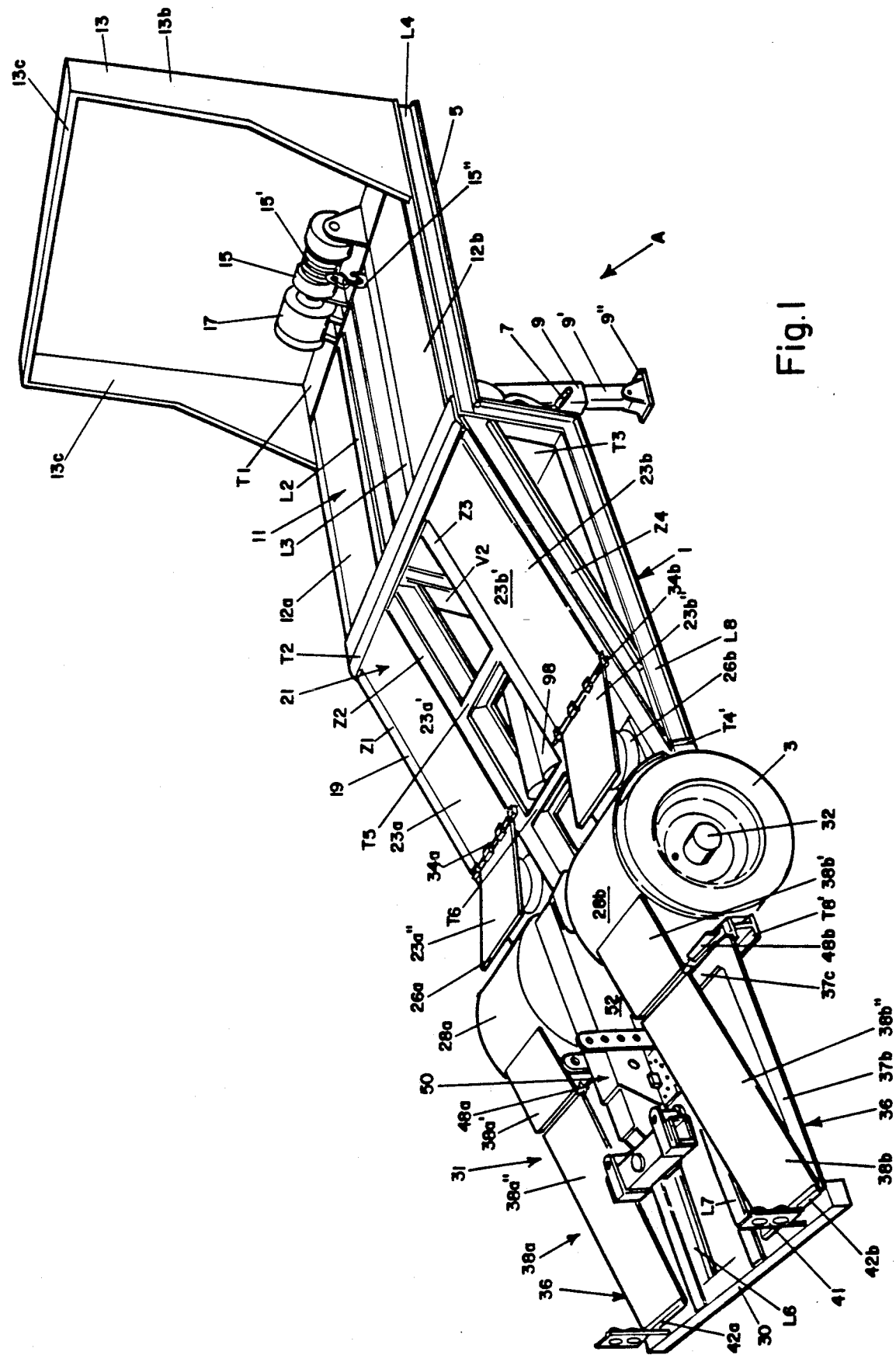
FIG. 1 is a vehicular towing platform in accordance with and embodying the present invention, as viewed in perspective.

Referring now by reference numerals to the invention, "A" generally designates the vehicular towing platform for engaging and moving a heavy disabled vehicle, and particularly a truck, truck tractor, fire truck or bus, as for moving it safely at least to an off-highway location where repairs and the like can be carried out.

Towing platform A comprises a main frame 1, supported at the rear by dual wheels 3 on axle R and having a forward frame portion 5 for being coupled to, for pulling by, a truck tractor T fifth-wheel type coupling F (FIGS. 7-11) in a manner described below, or when not so coupled, being supported at the front and beneath forward frame portion 5 by a conventional jacking mechanism 8 operated by a crank 7 carried by a jack 9 preferably having a telescoping extendible jack leg 9', being one of a pair of such legs, each carrying a jacking pad 9" at the lower end thereof in contact with the ground.

Main frame 1 is constructed generally of heavy gauge steel members which are welded together, and is preferred to include a plurality of spaced parallel longitudinal beams L1-L8, fixed to a pluralilty of spaced, parallel transverse beams T1-TS, as hereafter described. Middle portion 19 of main frame 1 also includes verticle V1-V4 and angled Z1-Z4 beams. Various other structural portions of platform A, such as vehicle support surface S and wheel covers 28a, 28b are formed of heavy steel or other metal plate.

More specifically, in the preferred embodiment, illustrated in FIG. 1, forward deck 11 is constructed of four spaced, parallel horizontal, longitudinal beams L1, L2, L3, L4 fixed at forward ends thereof to transverse beam T1 and similarly fixed at rear ends thereof to transverse beam T2. Crossbeams T1, T2 may be formed of steel (or other metal) plate rather than angle iron.

Middle deck 21 is triangular in side view and includes spaced, parallel vertical beams V1, V2, V3, V4 fixed to and depending from rear ends of longitudinal beams L1, L2, L3, L4, respectively, beneath transverse beam T2. Only vertical beams V2 and V4 are visible in the figures (FIG. 1). Lower ends of vertical beams V1-V4 are connected by and fixed to transverse beam T3 From the intersection of crossbeam T3 and the lower end of each vertical beam V1-V4 extends rearwardly a horizontal, longitudinal beam L5, L6, L7, L8, respectively, beams L5 and L8 being parallel to and shorter relative to beams L6 and L7. Beams L5 and L8 terminate rearwardly just forward of and are fixed to fenders or wheel covers 28a, 28b, respectively, of dual wheels 3 and beams L6 and L7 continue to extend parallel rearwardly, passing between dual wheels 3 and terminating at a transverse bumper or tail member 30 to which they are fixed, for example, as by welding. Removable tail lights 41 are provided toward the outer ends of bumper 30. In order to form a support for middle deck 21, middle portion 19 of main frame 1 includes longitudinal beams Z1, Z2, Z3, Z4 which angle parallel, downward and rearward from the respective points of fixation of their forward ends beneath transverse beam T2 at the intersections of corresponding vertical beams V1–V4 to intersect with and be fixed to short transverse beams T4 and T4'.

Short transverse beams T4, T4' are located parallel to an axle 32, which connects dual wheels 3, and are fixed to fenders or wheel covers 28a, 28b, respectively.

For further strength, transverse beams T5, T6 are disposed spacedly perpendicular between and fixed to angled beams Z2, Z3 (FIG. 1).

Rearwardly of wheels 3, short transverse beams T7, T7' are fixed to rear ends of wheel covers 28a, 28b, respectively and also fixed at inner ends thereof to corresponding longitudinal beams L6, L7.

A towing and accessory frame 13 consists of legs 13a, 13b connected at the upper ends thereof by crossbeam 13c. Frame 13 extends upwardly from forward frame portion 5 (preferably from the forwardmost end thereof) and includes within the lower part thereof a winch 15 powered by a winch motor 17 (mounted, for example, on a transverse cross-beam T1), the winch including a cable 15' and hook 15" for engaging a vehicle to be pulled on to the towing platform in a manner described below.

Main frame 1 carries thereon a vehicle support surface S which is transversely segmented as seen in FIG. 1. A forward deck segment of surface S, generally designated 11, of substantially horizontal configuration, is carried by forward frame portion 5 and includes substantially horizontal, longitudinal left and right deck surface portions 12a, 12b, respectively.

Main frame 1 includes a middle portion 19 which is of sloped configuration, thus sloping rearwardly from forward deck 11 to carry a middle deck segment generally designated 21 having transversely divided longitudinal left and right sloping ramp surface segments 23a, 23b. Preferably, forward subsegments 23a', 23b' of ramp surface segments 23a, 23b are rigidly fixed to and between longitudinal angled beams Z1, Z2 and Z3, Z4, respectively of frame portion 19 and connect by hinges 34a, 34b to movable rear subsegments 23a''', 23b''', respectively. Rear subsegments 23a''', 23b''' of middle deck 21 are made movable by pneumatic pillow-type devices, i.e., so-called "air bags", as designated 26a, 26b positioned respectively therebeneath on metal plates 27a, 27b to permit selective raising and lowering thereof.

Rigid metal wheel covers 28a, 28b are disposed longitudinally rearward of movable deck subsegments 23a''', 23b''', respectively. Wheel covers 28a, 28b are preferably substantially semi-circular and connect, as by conventional welding or bolting, at forward and rear ends thereof to main frame 1 for support (FIG. 4), as previously described.

A rear frame portion 36 of main frame 1 includes a rear deck surface segment generally designated 31 which consists of left 38a and right 38b rear deck ramp surface segments positioned longitudinally rearward of wheel covers 28a, 28b, respectively. Rear deck ramp surface subsegments 38a', 38b', of rear deck surface segments 38a, 38b are immovably fixed at the forward ends thereof to wheel covers 28a, 28b, for example, by welding and likewise at the rear ends thereof as by metal support plates 48a, 48b which connect crossbeams T8, T8'. Rear deck ramp surface subsegments 38a''', 38b''' are movably connected, as by hinges 42a, 42b to a rear bumper 30 of main frame 1 so as to permit substantially vertical movement of the forward ends of rear deck subsegments 38a''', 38b''', as shown in phantom in FIG. 4.

Figure 4:
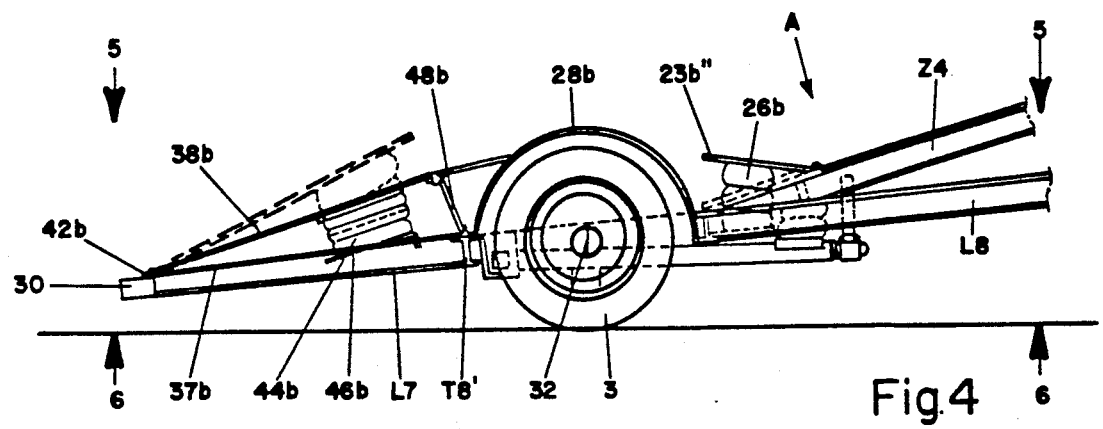
FIG. 4 is a partial side elevation view of the vehicular recovery and towing platform, showing the operation of certain pneumatically-driven ramps.
Figure 5:
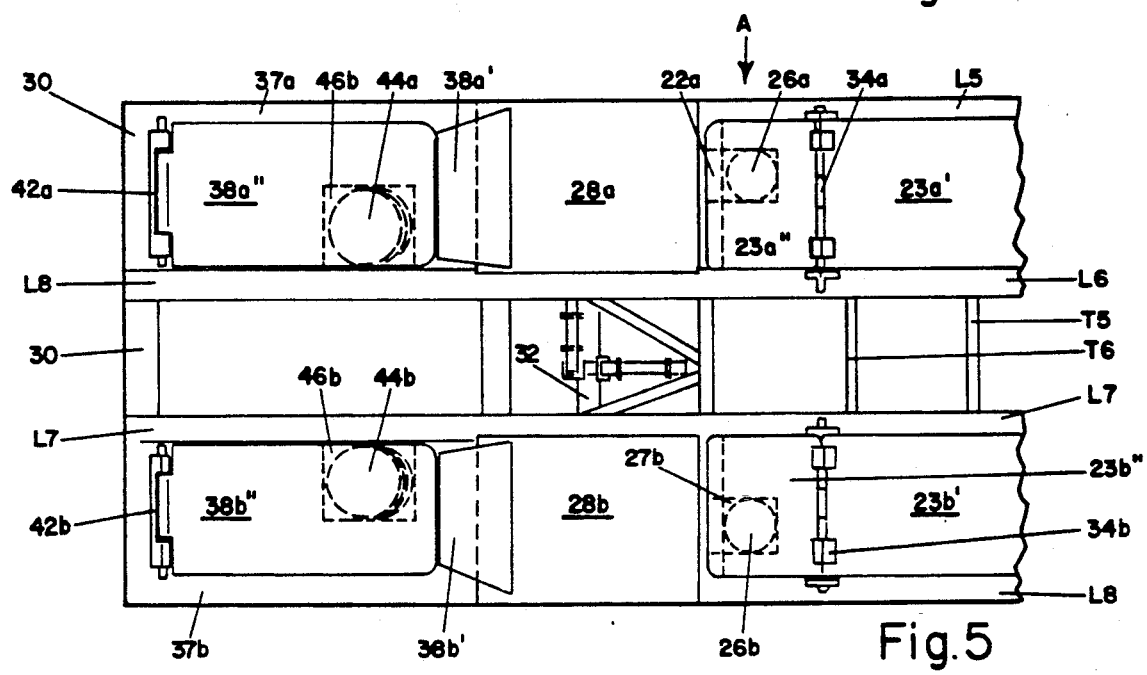
FIG. 5 is a corresponding fragmentary top plan view of the portions of the vehicular recovery and towing platform shown in FIG. 4.
Figure 6:
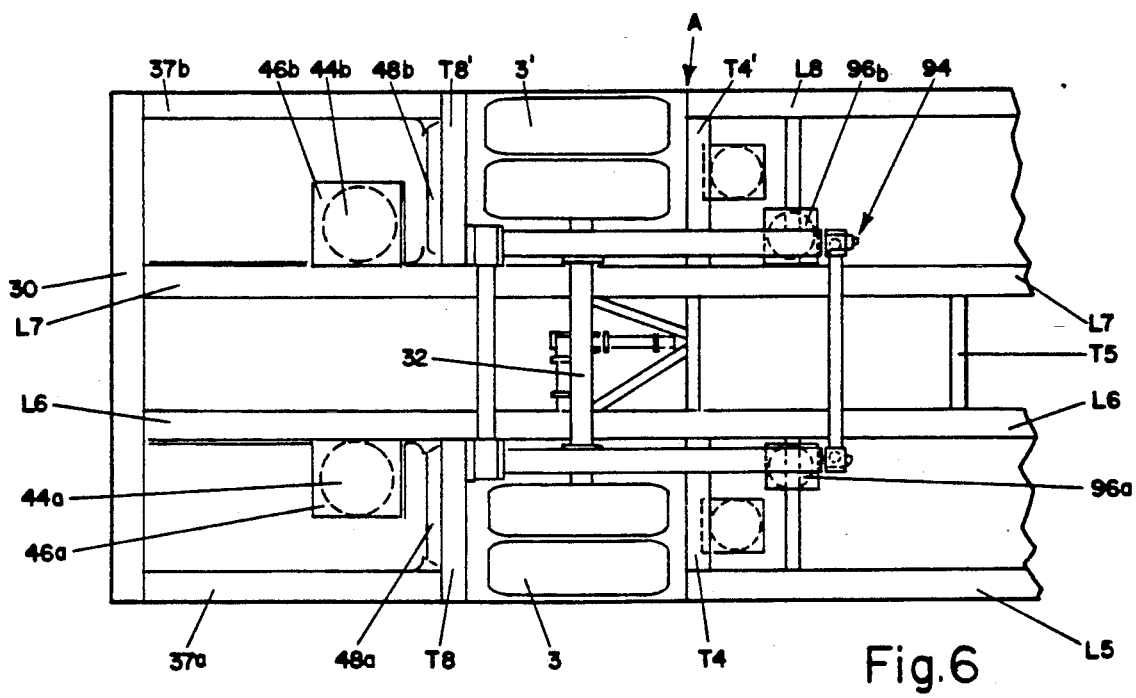
FIG. 6 is a corresponding bottom plan view of such portions.

Movable rear deck subsegments 38a''', 38b''' are made movable by pneumatic pillow type devices 44a, 44b respectively positioned on metal plates 46a, 46b disposed therebeneath, to permit selective raising and lowering thereof as required (FIGS. 4–6).

Horizontal metal strips 37a, 37b, 37c provide further strength to rear frame portion 36 by connecting bumper 30 to transverse beams T8, T8' (FIGS. 1, 4–6).

Figure 2:
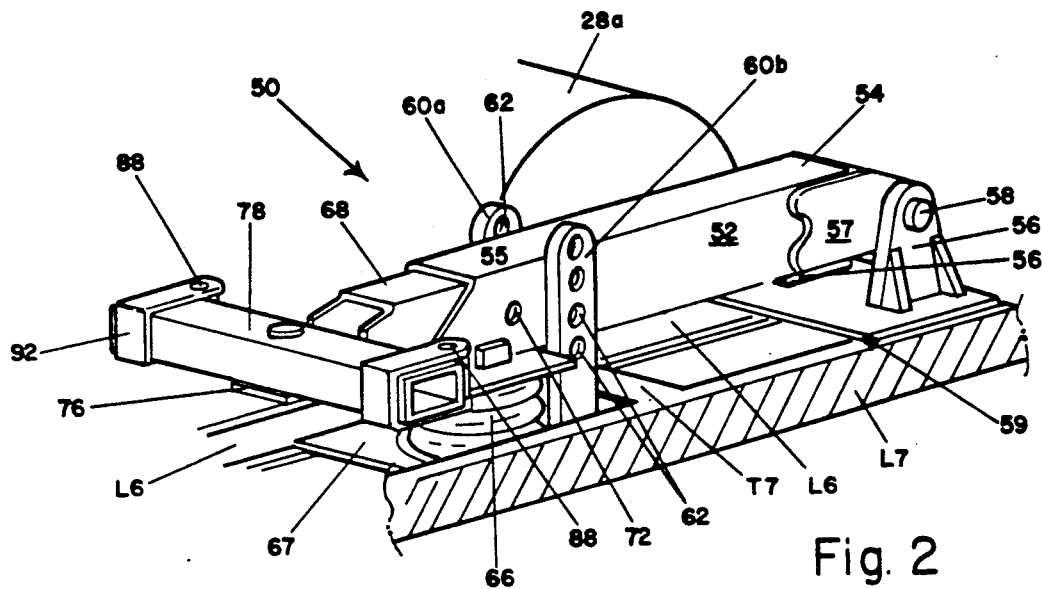
FIG. 2 is a fragmentary perspective view of a vehicle engagement assembly of the new vehicular recovery and towing platform.
Figure 3:
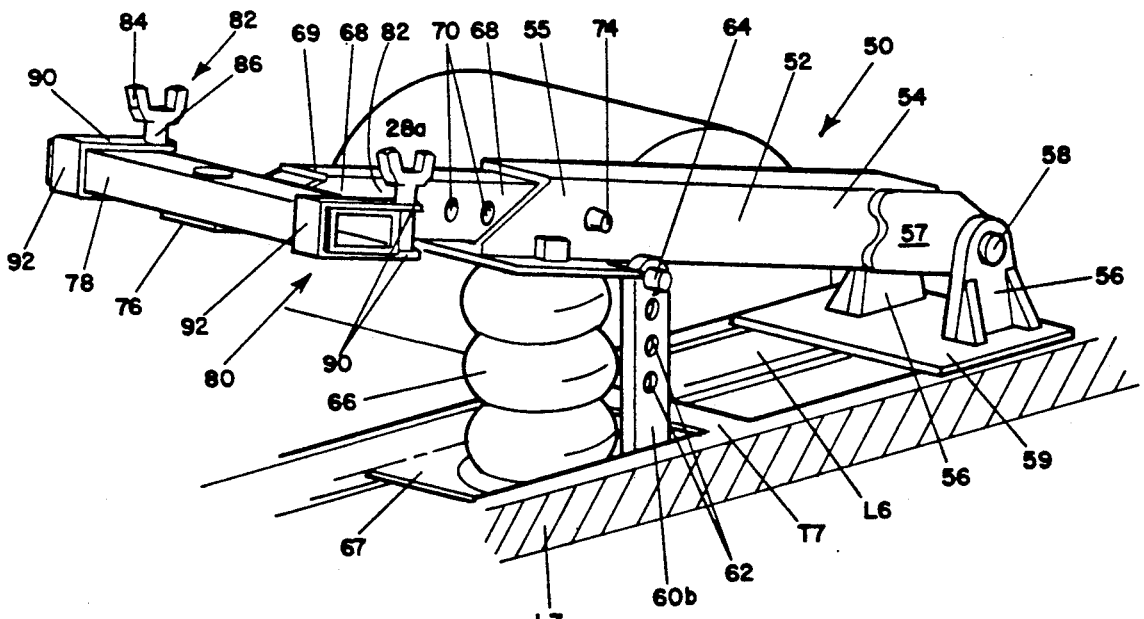
FIG. 3 is a similar view of the engagement assembly, as in raised position.

FIGS. 2 and 3 illustrate a vehicle engagement assembly 50 which is positioned along the central longitudinal axis of main frame 1, generally between rear ramp surface segments 38a, 38b of rear deck 31. Assembly 50 is pivotally attached to main frame 1 between dual wheels 3 at forward end 54 of a lift arm 52, as by mounting via brackets 56, 57 and bolt 58 to plate 59 which is fixed to beams L6, L7. Arm 52 is flanked by parallel upright members 60a, 60b which define identical spaced apertures 62 along the lengths thereof, whereby to insert a bolt 64 for supporting arm 52 in a raised position (FIG. 3). A pneumatic pillow-type device 66 is supported on metal plate 67 disposed beneath arm 52 forward of upright members 60a, 60b provides a means for automatically selectively raising or lowering vehicle engagement assembly 50.

A rigid "underreach" bar 68 is provided in telescoping relationship to arm 52 at the rear end 55 thereof and is provided with horizontal through holes 70 which are of similar size as a hole 72 provided in each of arms 52 and 55 for receiving bolt 74 in order to maintain underreach bar 68 in a preselected position (FIG. 3). Attached to flange 76 at an outward end 69 of telescoping underreach bar 68 is a rigid horizontal transverse member 78, which is preferably provided with vehicle keepers 80 at opposing ends thereof for facilitating engagement of a vehicle thereto.

Vehicle keepers 80 preferably consist of tools 82, which may be selected from various available sizes, provided with a U-shaped or forked portion 84 at a vertically positioned end thereof and a straight member 86 which extends outward from the back or base of forked portion 84. Straight member 86 is sized in length and diameter for penetrating aligned through holes 88 (FIG. 2) defined in opposing ends 90 of a U-shaped adaptor 92 disposed on each end of rigid horizontal transverse member 78 so that when in normal use position forked portions 84 of tools 82 securely receive and retain a front axle X or some other rigid frame portion (not shown) of a vehicle V to be towed by subject platform A, as is shown in part in side view in FIGS. 7 and 8.

FIG. 6 illustrates in part the underside of platform A and shows the general structure of a pneumatic shock assembly/suspension unit generally designated 94. Unit 94 is also provided with pillow-type pneumatic devices 96a, 96b for equalizing the load on platform A as a heavy vehicle is loaded onto or unloaded from platform A. Air tanks 98 for supplying all pneumatic features of platform A are shown in FIG. 1; however, for simplicity, air lines therefrom are not shown.

FIGS. 7 through 11 illustrate some of the great variety of heavy vehicles which may be transported by platform A. In use, platform A may be backed, as by truck T, partly beneath and in line with the vehicle to be towed. Then, the disabled vehicle may either be pulled further onto platform A, as by engagement by a cable of winch 15, may be driven onto the ramps under its own power, or may be attached as by vehicle engagement assembly 50.

Figure 7:
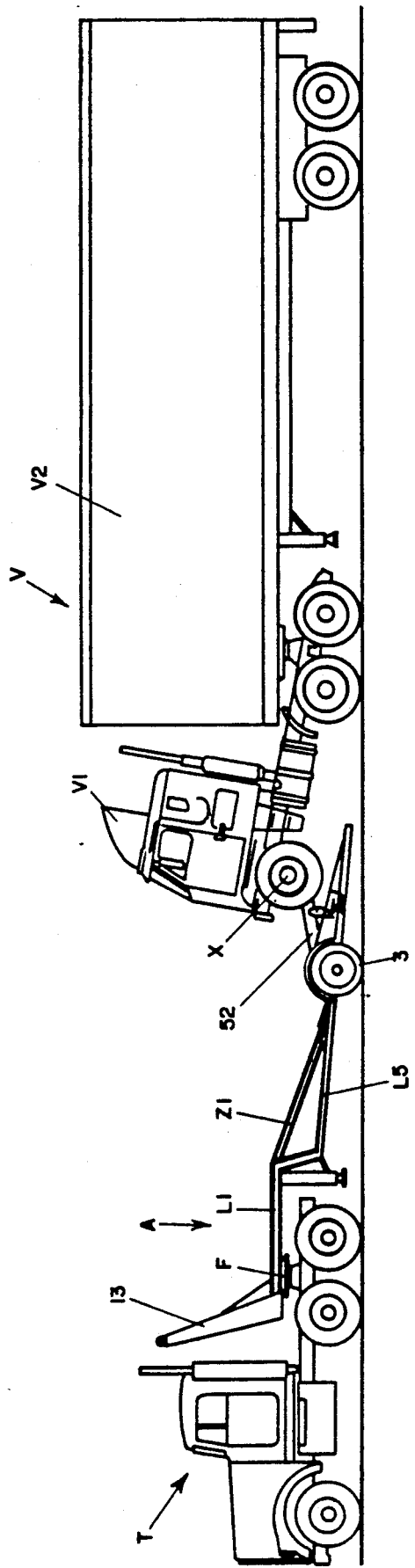
FIG. 7 is a side elevation view of the vehicular recovery and towing platform, as coupled to a truck tractor, and illustrating engagement of a disabled truck tractor.

To refer to the particular figures more specifically, FIG. 7 shows a disabled vehicle V, wherein the tractor V1 is engaged under axle X thereof by the vehicle engagement assembly 50. Trailer V2 remains attached to tractor V1 so that hauling of tractor V1 by truck T and vehicle towing platform A will in turn cause trailer V2 to be moved.

Figure 8:
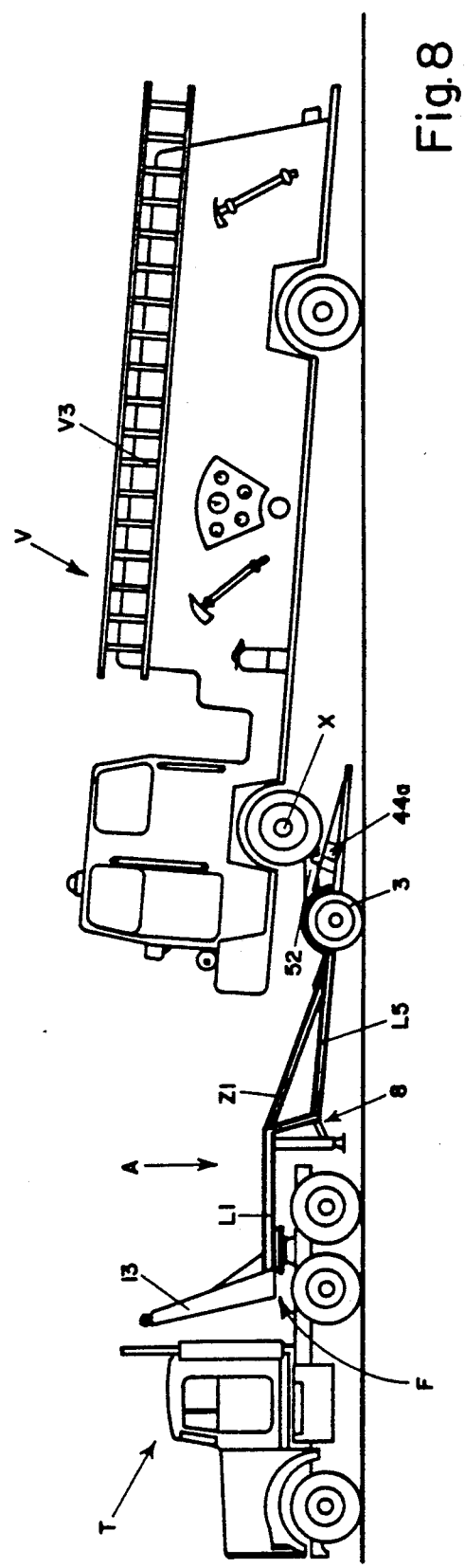
FIG. 8 is a side elevation view similar to FIG. 7, showing engagement of a fire truck.

FIG. 8 illustrates movement of a fire truck V3 in similar fashion as truck V2 above. Engagement for towing of fire trucks has heretofore typically been difficult or required highly specialized heavy duty wreckers, because of the fire truck's front overhang. However, with the present apparatus, arm 52 of vehicle engagement assembly 50 simply extends beneath the cab of firetruck V3 and attaches to axle X thereof. Adjustment of arm 52 can be made as necessary by operation of pillow-type pneumatic device 66 (not shown in this figure).

Figure 9:
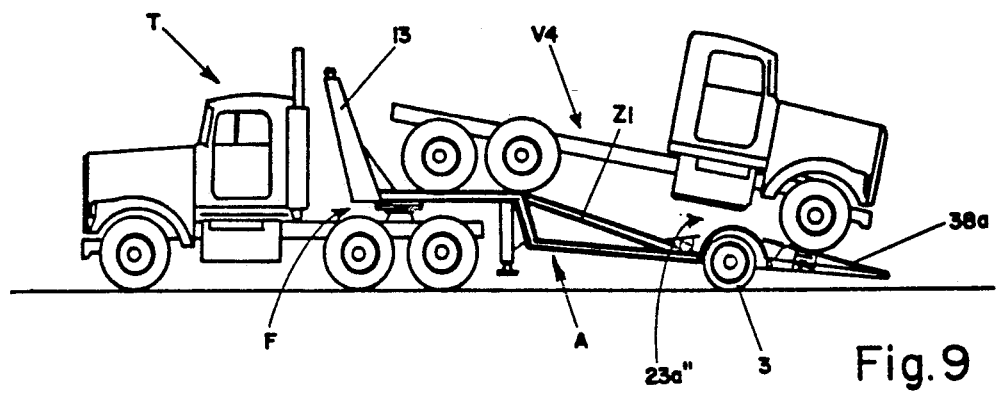
FIG. 9 is a side elevation view of the vehicular recovery and towing platform, as coupled to a truck tractor, and illustrating the manner in which a truck is capable of being carried in its entirety upon the towing platform.

FIG. 9 illustrates movement of a truck tractor V4, having a long wheel base positioned in its entirety upon platform A so that the rear of truck tractor V4 is toward truck T, as by backing or winching tractor V4 onto platform A.

Figure 10:
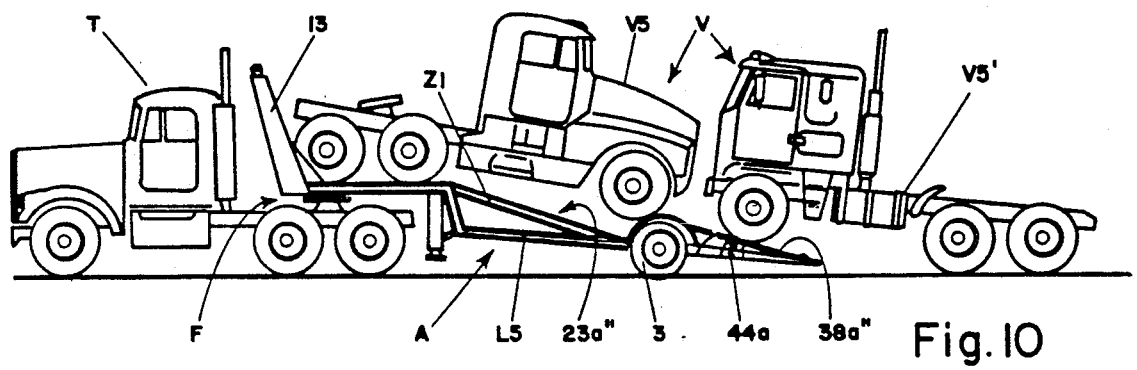
FIG. 10 is a side elevation view thereof, as so coupled, and showing not only a first truck tractor carried completely upon the towing platform, but also engaging a second truck tractor for towing purposes.

FIG. 10 illustrates positioning for simultaneous movement of two truck tractors V5, V5', both tractors having medium length wheel bases. Tractor V5 is loaded in its entirety upon platform A, preferably backward, and tractor V5' is loaded forwardly so that only the front tires of truck V5' are supported by rear deck 31 of platform A. This latter arrangement is useful if, for example, a front tire of a truck such as V5' has been damaged, but the rear tires remain functional. Note that in this arrangement movable subsegment 23a" of middle deck 21 is in a lowered position, whereas in FIG. 9 it is raised.

Figure 11:
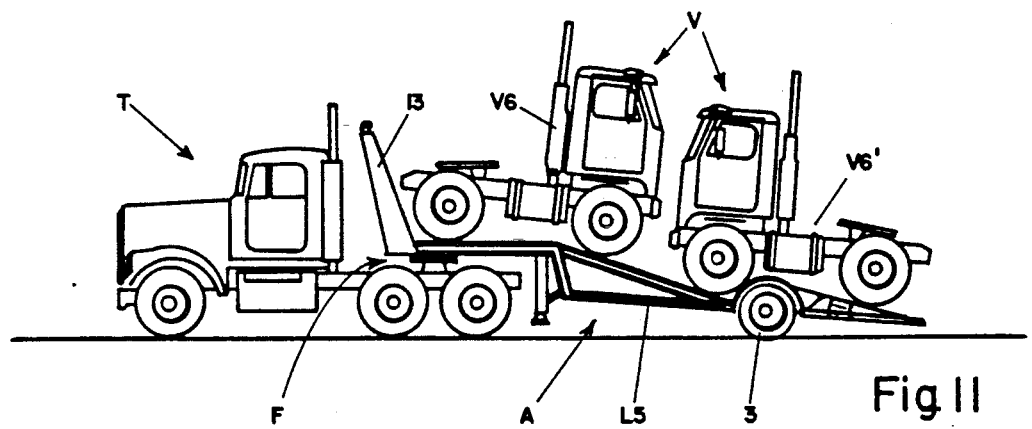
FIG. 11 illustrates, in side elevation view, the vehicular recovery and towing platform as carrying two truck tractors, both in the entirety, upon the towing platform.

FIG. 11 illustrates a further use of platform A, wherein two truck tractor. V6, V6', each having a short wheel base, are loaded in their entirety upon platform A; one tractor, V6, being loaded backward in relation to truck T and the other, V6', being loaded forwardly so that the two vehicles V6, V6' are substantially nose to nose in position. In this example, ramp subsegments 23a", 23b" and 38a", 38b" are all in the lowered position.

It may be readily seen, for example, in FIG. 10, that operation of pneumatic pillow-type device 44a (and corresponding device 44b not shown) would encourage truck V5' to roll backwards and off platform A when it is desired to unload the same.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A device for transporting vehicles by hauling, as well as by engaging and towing the vehicles; the device comprising:

a rigid, longitudinal first frame having front and rear ends and extending substantially horizontally therebetween, the front end being adapted for attachment to a fifth-wheel type truck tractor for pulling thereby;

a vehicle support surface mounted substantially horizontally on the first frame, having right and left longitudinal portions, each right and left longitudinal portion being formed of a plurality of segments along the length thereof, at least one segment of each right and left longitudinal portion of the vehicle support surface being transversely divided into a plurality of subsegments, at least one subsegment of each transversely divided segment being movable;

means for causing at least one subsegment of each transversely divided segment of each right and left longitudinal portion of the vehicle support surface to move;

a jacking mechanism mounted beneath the front end of the rigid longitudinal first frame;

a set of wheels supporting the rear end of the rigid longitudinal first frame; and a vehicle engagement assembly positioned along a central longitudinal axis of the first frame on the rear end thereof and pivotally attached thereto for securely retaining in position a vehicle loaded at least in part onto the device, wherein the rigid longitudinal first frame is constructed at least in part of heavy gauge angle iron and is formed of a plurality of horizontal longitudinal bars separated by and fixed to a plurality of horizontal transverse bars along the length of the longitudinal bars, and further comprising a central portion being angled forwardly upward in longitudinal section and having a plurality of substantially vertical bars positioned at a front end thereof, the substantially vertical bars being fixed at lower ends thereof to front ends of corresponding substantially horizontal longitudinal bars and further connecting at upper ends thereof forward ends of corresponding angled longitudinal bars, the angled longitudinal bars being fixed at rear ends thereof to the corresponding substantially horizontal longitudinal bars.

2. The device of claim 1, wherein the plurality of segments of the vehicle support surface right and left portions comprise forward, middle and rear segments and wherein the support surface right and left portions each include a wheel cover provided in corresponding longitudinal alignment therewith between the middle and rear segments thereof and rigidly fixed to the first frame so as to be spaced outwardly of and above the wheels.

3. The device of claim 2, and further comprising a bumper fixed horizontally and transversely at an intersection of the rear end of the rigid longitudinal first frame and a rearmost end of the rear segments of the right and left longitudinal portions of the vehicle support surface.

4. The device of claim 2, wherein each middle segment is transversely divided into a plurality of subsegments and one of the movable subsegments is provided forwardly of and adjacent to each wheel cover such that a rear end of each said movable subsegment is substantially vertically selectively adjustable in relationship thereto.

5. The device of claim 1, and further comprising winching means mounted substantially adjacent to the front end of the first frame for aiding the loading of a vehicle to be towed at least in part upon the device.

6. The device of claim 1, and further comprising a rigid second frame, the second frame being rectangular and fixed substantially vertically and transverse at the front end of the rigid longitudinal first frame so as to extend thereabove and provide a site for selectively mounting accessories thereto.

7. The device of claim 6, wherein the rigid second frame has a lower horizontal crossbar, and further comprising winching means mounted on the lower horizontal crossbar of the rigid second frame, for aiding the loading of a vehicle to be towed by or supported at least in part upon the device.

8. The device of claim 1, wherein the set of wheels consists of tandem dual wheels located so that a central longitudinal axis of the first frame is interposed equidistant therebetween.

9. The device of claim 1, wherein the vehicle engagement assembly is adjustable and the device further comprises means for causing the vehicle engagement assembly to be adjusted.

10. The device of claim 9, wherein the vehicle engagement assembly consists of a rigid arm having first and second ends and extending longitudinally therebetween along the central longitudinal axis of the rigid first frame, the first end being pivotally connected to the first frame for selective vertical adjustability; a first rigid bar disposed coaxially withih the rigid arm at the second end thereof so as to be capable of selective telescoping extension and retraction therein and having an outwardly extending end; a second rigid bar having opposing ends and being horizontally and transversely attached to the outwardly extending end of the first rigid bar; vehicle connection means disposed on the opposing ends of the second rigid bar; vertical adjustment means contacting the rigid arm and longitudinal adjustment means provided on the telescoping first rigid bar for selective positioning of the vehicle engagement assembly as required by the size of the particular structure of a vehicle engaged thereby in order to properly tow such vehicle by and behind said device.

11. The device of claim 10, wherein the vertical adjustment means comprises a pair of rigid, vertical members fixed to the first frame in parallel relation to each other and each defining a series of spaced apertures, the parallel members being positioned on each side of and adjacent to the rigid arm inward of the second end thereof such that corresponding apertures in the vertical members are aligned; a bolt of sufficient length and of such diameter as to be capable of penetrating corresponding aligned apertures in the vertical members and extending beneath the rigid arm for support thereof at a preselected height; and a pneumatically operated pillow-type device disposed adjacent and rearward of the rigid vertical parallel members for automatically adjusting the vertical position of the rigid arm.

12. The device of claim 9, wherein the means for causing the vehicle engagement assembly robe adjusted is provided with means for pneumatic operation thereof.

13. The device of claim 1, wherein the movable subsegments of the right and left longitudinal portions of the vehicle support surface are connected by hinges to adjacent subsegments thereof, the adjacent subsegments being fixed at least to the first frame.

14. The device of claim 13, wherein the adjacent subsegments are fixed at rear ends thereof to the rigid first frame and at forward ends thereof to corresponding wheel covers.

15. The device of claim 13, and further comprising a bumper fixed horizontally and transversely at an intersection of the rear end of the rigid longitudinal first frame and the rear end of the rear segments of the right and left longitudinal portions of the vehicle support surface, and wherein said rear segments are transversely divided into forward and rear subsegments, each forward subsegment being fixed at a forward end thereof to a corresponding wheel cover and being fixed at a rear end thereof to and spacedly upward from the first frame, each rear subsection being hingedly connected at a rear end thereof to said bumper and hingedly connected at a forward end thereof to a corresponding adjacent forward subsection so as to provide a ramp which angles upward from said bumper to each wheel cover, each rear subsection being substantially vertically selectively adjustable at the front end thereof relative to the corresponding forward subsection.

16. The device of claim 1, wherein two of the movable subsegments are provided in each right and left longitudinal portion of the vehicle support surface.

17. The device of claim 1, wherein the means for causing the movable subsegments to move is disposed beneath each movable subsegments and is provided with means for pneumatic operation thereof.

18. A wheeled trailer for transporting by hauling, and engaging and towing vehicles comprising a main frame extending lengthwise of the trailer and having front and rear portions, the front end being adapted for attachment to a towing vehicle for the trailer, wheels supporting the rear end of the main frame oppositely disposed rearwardly of the trailer, a vehicle support surface carried by the main frame having oppositely disposed inclined portions respectively generally aligned with the oppositely disposed wheels, each such longitudinal portion having an end segment rearward of the wheels closely adjacent ground level on which a vehicle can be roller, an elevated forward segment forward of the trailer, and at least one elevatable segment forward of the wheels but rearward of the forward segment, the elevatable segment being elevatable from a retracted position to an elevated position and when in the elevated position providing an orientation for the vehicle support surface allowing wheels of a vehicle to be engaged to roll along the vehicle support surface between positions on and off the trailer continuously from the end segment to the forward segment, means for causing selective movement of the elevatable segments between the retracted and elevated positions, a cable winch forward of the trailer for winching a vehicle onto the vehicle support surface, and a vehicle engagement assembly positioned along a central longitudinal axis of the main frame and carried by the rear portion of the main frame for securely retaining in position a vehicle loaded at least in part onto the trailer for towing of the vehicle, the vehicle engagement assembly comprising means for pivotal movement of a towed vehicle relative to the main frame for permitting turning of the vehicle when towed by the trailer.

19. A wheeled trailer for engaging and towing vehicles according to claim 18 wherein the forward and rear segments of the oppositely disposed portions of the vehicle support surface define inclined ramps on opposite sides of the trailer extending from a point proximate ground level at the rear of the trailer to a forward point elevated from ground level, the inclined ramps each being interrupted by the presence of the wheels, the elevatable segments when elevated adapting said ramps to accommodate the wheels of a vehicle to permit loading thereof onto the trailer.

* * * * *

UNITED STATES PATENT AND TRADEMARK OFFICE
CERTIFICATE OF CORRECTION

PATENT NO. : 5,326,215

DATED : July 5, 1994

INVENTOR(S) : Eberhardt, Michael W.

It is certified that error appears in the above-identified patent and that said Letters Patent is hereby corrected as shown below:

Claim 18, column 10, line 44, change "roller" to read --rolled--.

Signed and Sealed this

Twenty-second Day of November, 1994

Attest:

Attesting Officer.

BRUCE LEHMAN

Commissioner of Patents and Trademarks